US012380762B2

(12) United States Patent
Barrera et al.

(10) Patent No.: US 12,380,762 B2
(45) Date of Patent: Aug. 5, 2025

(54) GAMING MACHINE AND METHOD WITH TRANSMISSIVE DISPLAY AND MECHANICAL REELS

(71) Applicant: Everi Games Inc., Austin, TX (US)

(72) Inventors: Francisco Barrera, Austin, TX (US); Steven Meyer, Austin, TX (US)

(73) Assignee: Everi Games, Inc., Austin, TX (US)

( * ) Notice: Subject to any disclaimer, the term of this patent is extended or adjusted under 35 U.S.C. 154(b) by 258 days.

(21) Appl. No.: 18/218,663

(22) Filed: Jul. 6, 2023

(65) Prior Publication Data

US 2025/0014414 A1 Jan. 9, 2025

(51) Int. Cl.
*G07F 17/32* (2006.01)

(52) U.S. Cl.
CPC ................................ *G07F 17/3213* (2013.01)

(58) Field of Classification Search
CPC ............................. G07F 17/3213; G07F 17/34
USPC ............................................................ 463/31
See application file for complete search history.

(56) References Cited

U.S. PATENT DOCUMENTS 10,535,230 B2 * 1/2020 Lutnick ............... G07F 17/3223
2009/0029766 A1 * 1/2009 Lutnick ............... G07F 17/3237 463/29
2009/0093300 A1 * 4/2009 Lutnick ............... G07F 17/3293 463/31
2009/0098921 A1 * 4/2009 Manning ................. G07F 17/34 463/17
2010/0048302 A1 * 2/2010 Lutnick ............... G07F 17/3218 463/42
2010/0124967 A1 * 5/2010 Lutnick ............... G07F 17/3286 463/43
2011/0065490 A1 * 3/2011 Lutnick ............... G07F 17/3223 463/16
2013/0116032 A1 * 5/2013 Lutnick ............... G07F 17/3276 463/25
2014/0370958 A1 * 12/2014 Lutnick ................. G07F 17/322 463/25
2020/0160666 A1 * 5/2020 Lutnick ............... G07F 17/3239
2022/0198878 A1 * 6/2022 Lutnick ............... G07F 17/3223

* cited by examiner

*Primary Examiner* — Pierre E Elisca
(74) *Attorney, Agent, or Firm* — Calvert Technology Law, PLLC; Nathan H. Calvert

(57) ABSTRACT

A gaming machine, method, and program product provide for control of a transmissive video display positioned in front of a mechanical reel display. At least one electronic controller operating the gaming machines causes reels to spin and stop to display symbols on selected symbol locations visible through the transmissive video display. While the reels are spinning, a position indicator from the mechanical reel display indicating a current position of each reel, and graphic display elements are shown using the transmissive video display, the graphic display elements controlled to move along with selected ones of the symbols based on the position indicator and a first delay characteristic associated with the transmissive video display.

20 Claims, 9 Drawing Sheets

GAMING MACHINE AND METHOD WITH TRANSMISSIVE DISPLAY AND MECHANICAL REELS

TECHNICAL FIELD OF THE INVENTION

The invention relates to gaming machines including a transmissive display through which is viewed a mechanical reel assembly.

BACKGROUND OF THE INVENTION

Gaming machines commonly referred to as “slot machines” may include one or more mechanical rotating elements such as physical reels used to form a matrix of symbol locations. The reels carry game symbols on their periphery and the rotational position of the reels determine the game symbols that line up along one or more paylines defined across the matrix of symbol locations for a given play in the game to indicate the result of the play, some prize or a loss. Other rotating elements such as prize-indicating wheels may also be included to communicate the result (or a portion of the result) of a play to the player.

Generally, gaming machines that show results by either mechanical rotating elements or video representations of such elements may operate in either a prize-first process or a reels-first process. In the latter processes, the reels and/or other rotating elements are caused to rotate and then each stop at a randomly or pseudo-randomly selected rotational position to show the player the result of the play by the game symbols lined up along the payline(s) at the those “randomly” determined rotational positions. In a prize-first process, a prize may be randomly or pseudo-randomly determined and then the gaming machine may control the rotating elements to each stop at a respective position to show the prize (or portion thereof in certain game mechanics). In either the prize-first process or reels-first process, it is necessary to detect the rotational position (angular orientation) of each rotating element in the stopped position because that position dictates the game symbol displayed to the player and thus the game result communicated to the player by the alignment of game symbols.

Early mechanical slot machines used mechanical arrangements for detecting the rotational position of each rotatable element. Modern gaming machines use electronic or photoelectronic systems to detect the rotational position of a rotatable element such as a reel, either for determining when the rotatable element must stop to show the desired symbol or for detecting the stop position of the rotatable element and thus the game symbol or symbols displayed by that rotatable element. Modern gaming machines also commonly use a stepper motor for each rotatable element in order to drive the respective element in discrete angular steps.

Historically, suitable light producing devices such as LEDs coupled with photoelectric detectors (photodetectors) have been used to sense the rotational position of a respective rotatable element. This type of setup requires the use of notches in the hub of the rotatable element which allow the photosensor to produce a desired output signal when the notch is aligned with the LED and provide a signal to the control computer that the rotatable element is in a known reference position. Typically, there are two photodetectors used—one which is used to set a “home” position, which would be triggered once every rotation (360 degrees) via a single deep (radially deep) notch in the hub of the reel, and one which is used to set a ‘wedge’ position, which would be triggered every 15 degrees (for a 24 slice wedge, other combinations are also used) via multiple shallow (radially shallow) notches set in the hub of the rotatable element. As the hub rotates, the sensors are triggered and produce the desired output when the respective slot permits an opening to allow the light from the LED to reach the photodetector. It is also possible to use reflective/non-reflective elements on the hub of the rotatable element so that the light source and photosensor may be positioned on the same side of the rotatable element. Alternatively to photosensor arrangements, rotating magnetic sensor arrangements can be used to detect the rotational position of a rotatable element.

When it is desired to synchronize video graphics with the movement of mechanical reels, the positions of such video graphics may be visually displaced from their desired locations due to signal timing, control delays, and position sensor accuracy issues.

SUMMARY OF THE INVENTION

An object of the present invention is to provide rotatable element sensor arrangements that overcome the above-noted problems with synchronizing video graphics with mechanical reels, especially when using transmissive displays positioned in front of the reels. Other objects of the invention include providing control techniques for such transmissive displays that may be used with a variety of mechanical reel arrangements, and a variety of transmissive displays.

A gaming machine according to a first aspect of the present invention includes a cabinet with at least one player input device. A mechanical reel display is mounted in the cabinet and includes multiple reels each with multiple symbols thereon. A transmissive video display is positioned in front of the mechanical reel display. At least one electronic controller is coupled to control the mechanical reel display and the transmissive video display and programmed for: causing the reels to spin and stop to display symbols on selected symbol locations visible through the transmissive video display; while the reels are spinning, receiving a position indicator from the mechanical reel display indicating a current position of each reel; and while the reels are spinning, providing graphic display elements using the transmissive video display, the graphic display elements controlled to move along with selected ones of the symbols based on the position indicator and a first delay characteristic associated with the transmissive video display.

According to a second aspect of the invention, a method is provided for operating a gaming machine under control of at least one electronic processor. The method includes causing reels of a mechanical reel display of the gaming machine to spin and stop to display symbols on selected symbol locations visible through a transmissive video display of the gaming machine. While the reels are spinning, the method includes receiving a position indicator from the mechanical reel display indicating a current position of each reel. Also while the reels are spinning, the method includes while the reels are spinning, providing graphic display elements using the transmissive video display, the graphic display elements controlled to move along with selected ones of the symbols based on the position indicator and a first delay characteristic associated with the transmissive video display.

Another aspect of the invention is a computer program stored on a tangible non-transitory readable medium. The software version is, of course, typically designed to be executed by a gaming machine or networked gaming system. The software includes multiple portions of computer executable code referred to as program code. Gaming results are provided in response to a player activation and displayed by display program code that controls the mechanical reel display and transmissive display according to the method summarized above.

Another aspect of the invention is a gaming system that includes one or more gaming servers, and a group of electronic gaming machines connected to the servers by a network, programmed to provide one of more of the methods described herein. The various functionality described herein may be distributed between the electronic gaming machines and the gaming servers in any practically functional way. For example, the current preferred architecture is for the servers to determine all aspects of game logic, random number generation, and prize awards. The servers may be special purpose gaming servers. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touchscreen input from the player and to display graphics received from the server.

Different features may be included in different versions of the invention. These and other advantages and features of the invention will be apparent from the following description of the preferred embodiments, considered along with the accompanying drawings.

DESCRIPTION OF REPRESENTATIVE EMBODIMENTS

Figure 1:
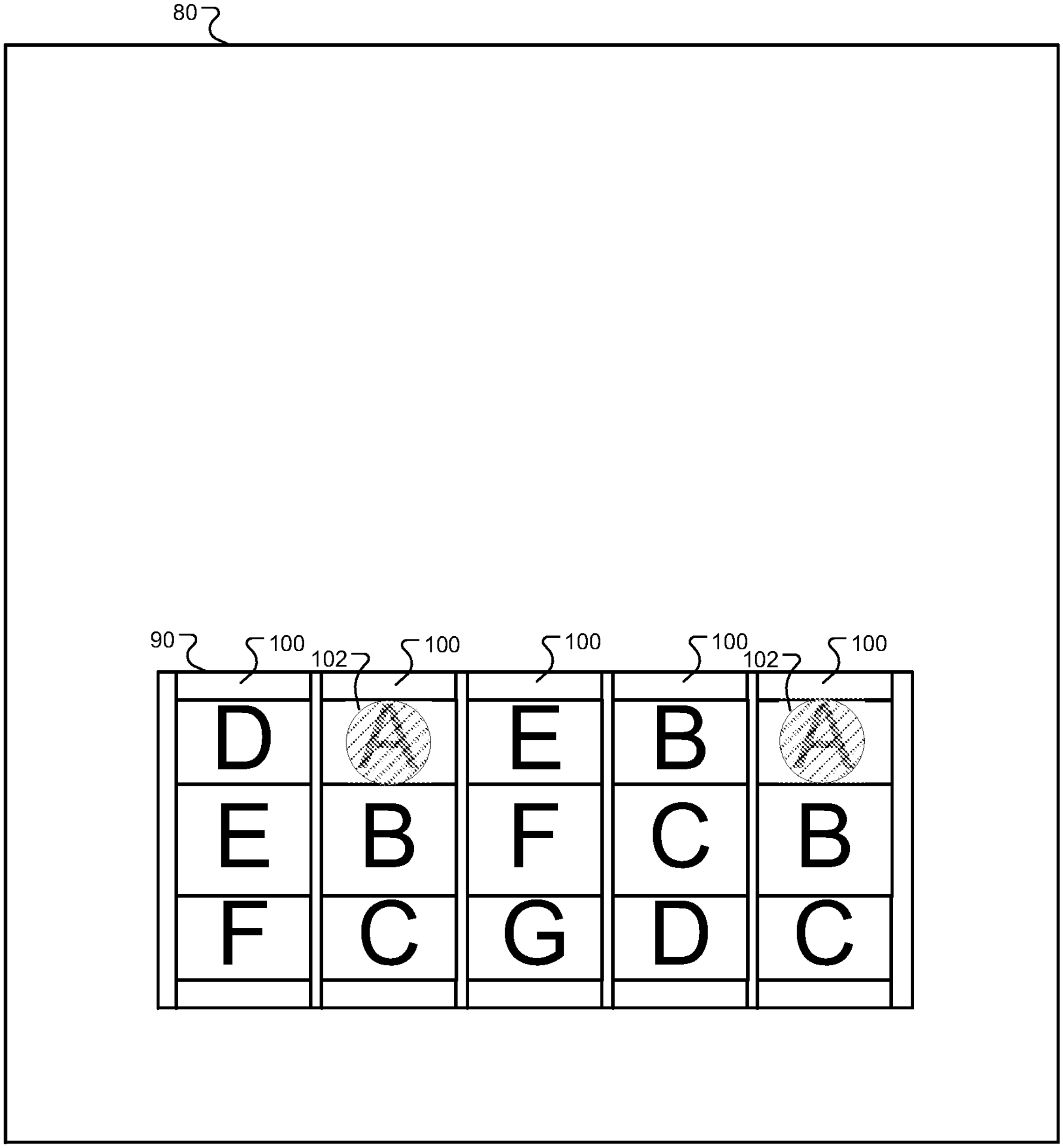
FIG. 1 is a front view of a gaming display including a mechanical reel assembly visible through a transmissive display.
Figure 2:
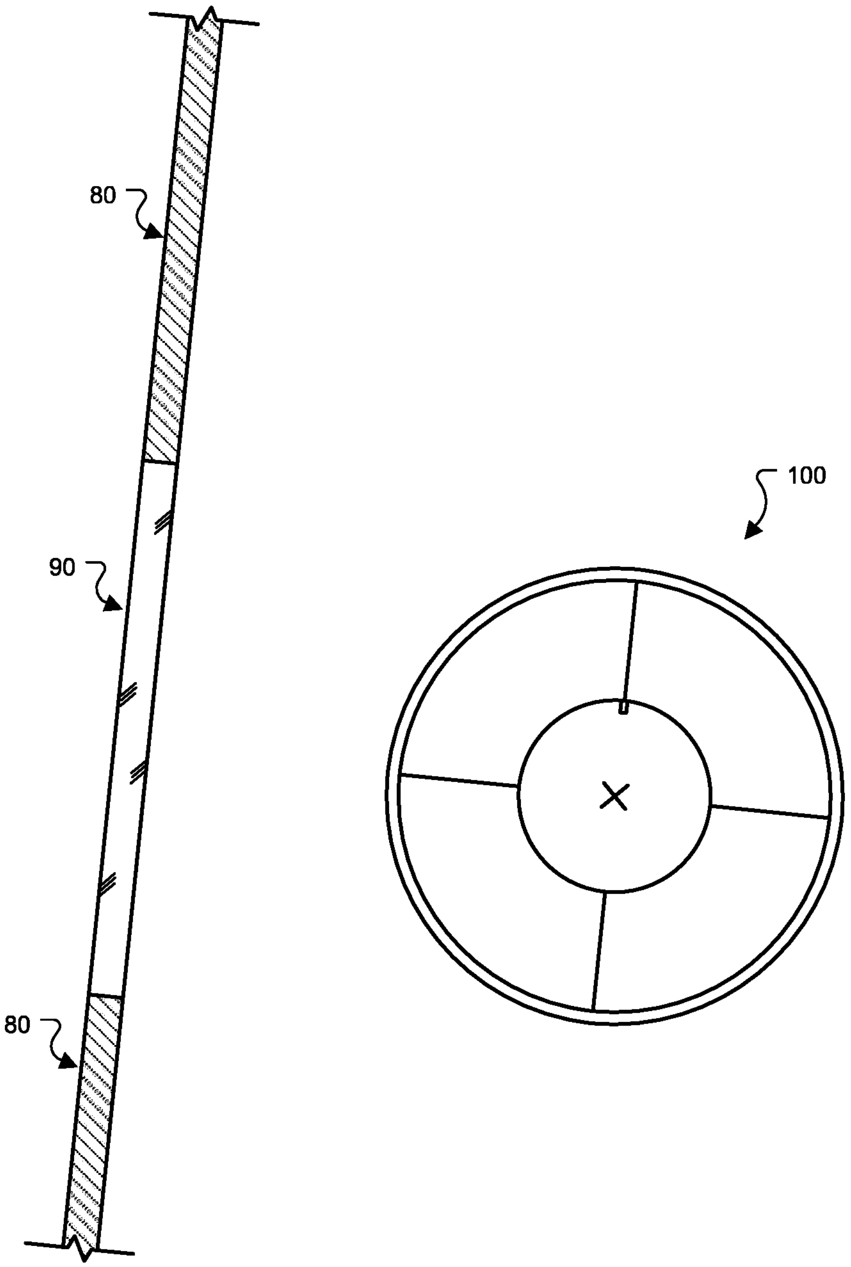
FIG. 2 is a side cross-sectional view of the gaming display of FIG. 1.

FIG. 1 is a front diagram view of a gaming display 80 including a mechanical reel assembly with five reels 100 visible through a transmissive display 90. FIG. 2 is a side cross-sectional view of the gaming display of FIG. 1.

Referring to both FIG. 1 and FIG. 2, in this embodiment, transmissive display 90 forms a window in the larger gaming display 80 which is a flat screen electronic display. Transmissive display 90 is a transmissive video display device able to show video superimposed over a transparent viewing area. As shown in FIG. 1, reels 100 each include multiple symbol locations each indicated by a capital letter symbol. The symbol locations are present on reel strips as further described below. Transmissive display 90 is positioned in front of reels 100, at an angle to allow a player to view reels 100 and any video graphics presented on transmissive display 90 at the same time. For example, two graphic elements 102 are presented on the transmissive display 90 superimposed over two 'A' symbols. Graphic elements 102 are animated to move along with the reel symbols to maintain their position relative to the reel symbols as further described below.

Figure 3:
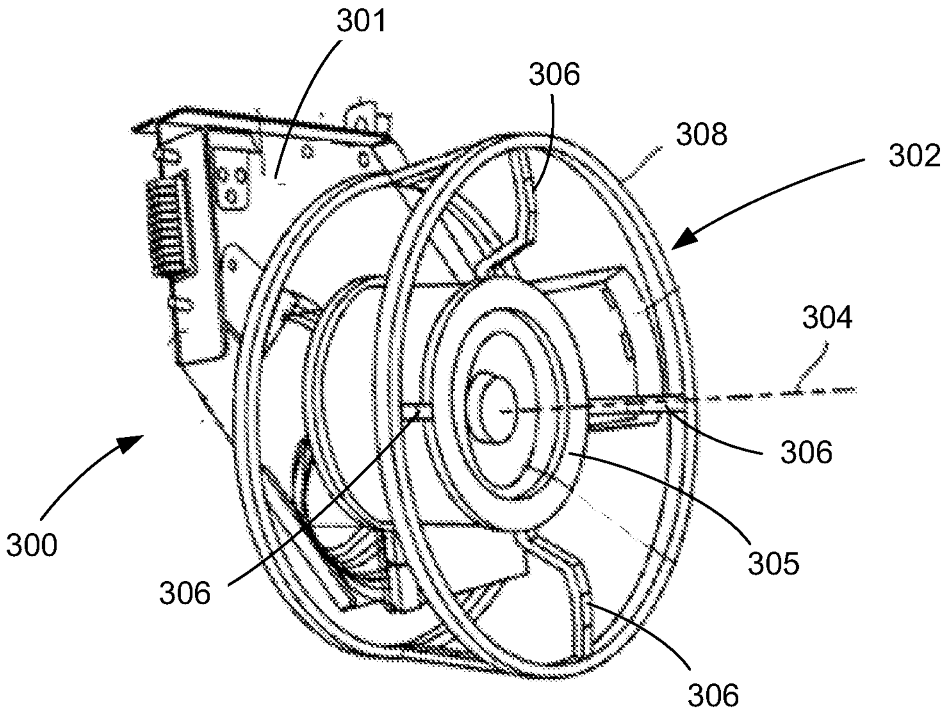
FIG. 3 shows a mechanical reel assembly including a position sensor according to some embodiments.

FIG. 3 shows a mechanical reel assembly 300 including a position sensor according to some embodiments. Mechanical reel assembly 300 is suitable for implementing reels 100 in FIG. 1. A rotatable element sensor arrangement may be used to detect the rotational position of a gaming machine reel such as the reel included in the reel assembly 300. This example reel assembly 300 includes a mounting bracket 301 that supports a reel cage 302 on which a reel symbol strip (not shown in FIG. 3) may be mounted to define the gaming machine reel. Reel cage 302 is mounted for rotation on bracket 301 about a rotational axis 304, and includes a hub 305, spokes 306, and a rim 308 on which a reel symbol strip may be secured. A motor for rotating the reel cage 302 may be mounted on the bracket 301 and housed within hub 305 (and thus concealed in the view of FIG. 3). The motor may comprise a stepper motor that receives a drive signal from a motor driver circuit under the control of a suitable motor controller which may include a microprocessor.

Figure 4:
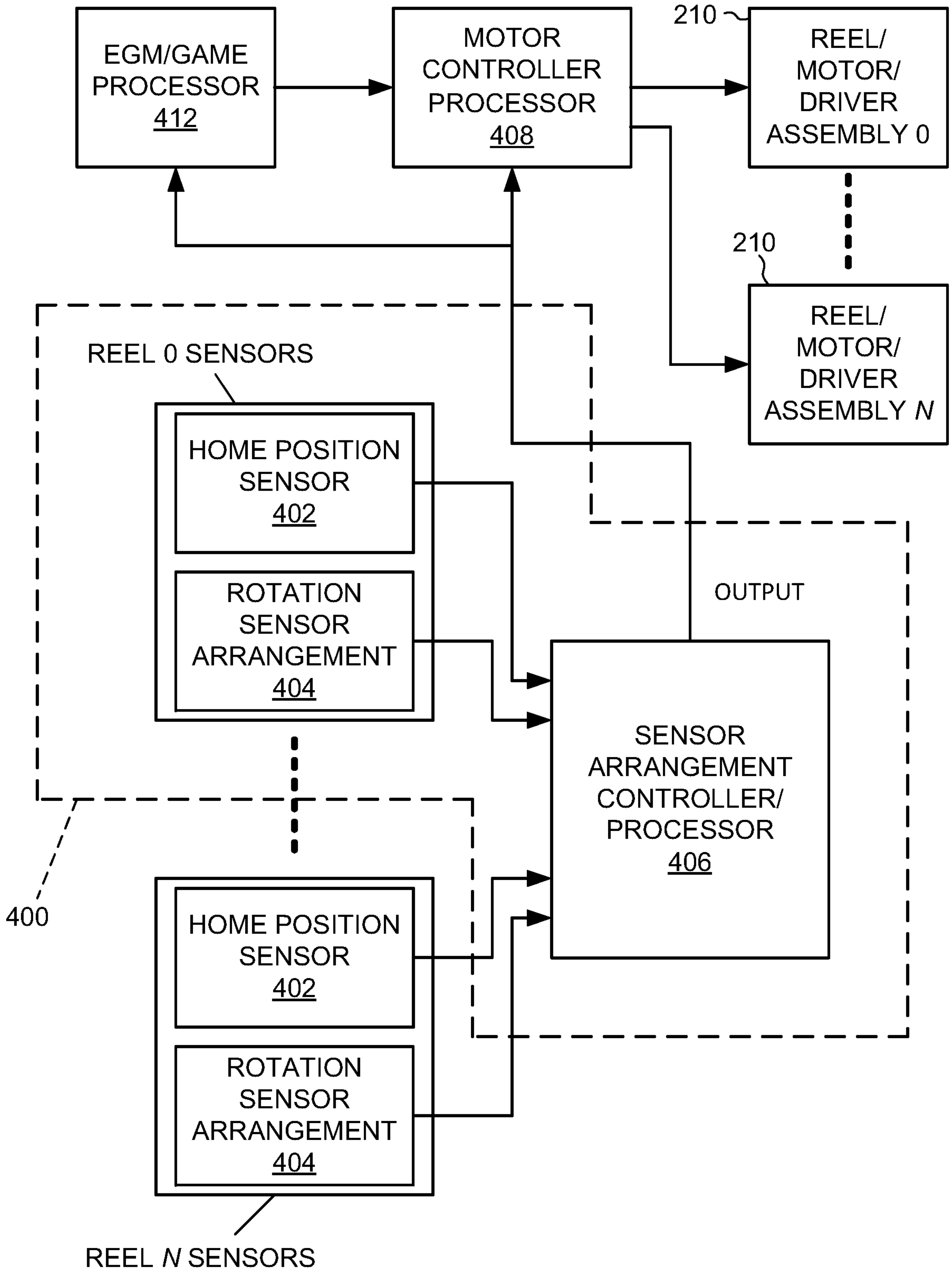
FIG. 4 is a schematic representation of a gaming machine having a rotatable element rotation position detector arrangement in accordance with an embodiment of the present invention.

Referring to FIG. 4, a rotatable element sensor arrangement 400 according to one aspect of the invention includes a home position sensor 402, a magnetic field-type rotation sensor arrangement 404, and a sensor arrangement controller 406. The home position sensor 402 is operable for producing a home position signal in response to a sensor position alignment with a home position feature as the rotatable element rotates about an axis of rotation. The sensor position is at a known angular orientation relative to an evaluation position (which may be a payline position) that is stationary with respect to the rotatable element. An example home position feature will be described in reference to FIG. 4 but is not shown in FIG. 2. The home position feature is located at a known rotational position relative to a series of game symbol positions along a periphery of the rotatable element.

Figure 5:
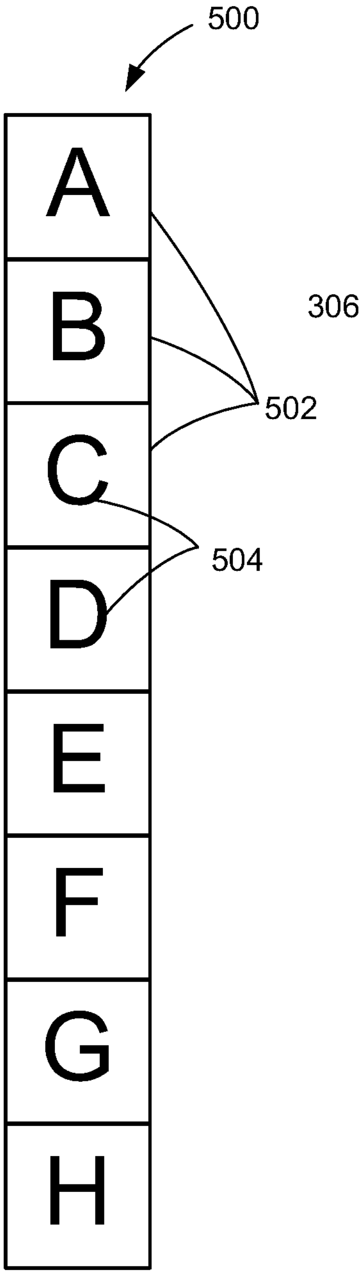
FIG. 5 is a representation of a reel strip that may be used with the reel assembly shown in FIG. 1.

FIG. 5 shows an example game symbol strip 500 defining such a series of game symbol positions 502, each with a respective game symbol 504 represented by alphabetic characters in the example. The magnetic field-type rotation sensor arrangement 404 is operable for producing a rotation signal over the course of each rotation of the rotatable element (such as a reel defined by reel cage 302 in FIG. 3) about the axis of rotation. This rotation signal provides an indication of rotational angle of the rotating element at a defined resolution along each rotation of the rotatable element. The sensor arrangement controller 406 is operably connected to receive the home position signal and the rotation signal and produce a sensor arrangement output indicative of a position along the series of game symbol positions 502 such as those shown in the example reel symbol strip 500 shown in FIG. 5 relative to the evaluation position.

The example arrangement shown in FIG. 4 includes a separate set of home position sensor 402 and rotation sensor arrangement 404 for each rotatable element for which the rotational position is to be determined. Two or more of these sets of home position sensor 402 and rotation sensor arrangement 404 may send their respective outputs to a single sensor arrangement controller/processor 406 as shown in FIG. 4. Alternatively, one or more of the sets of home position sensor 402 and rotation sensor arrangement 404 in a given gaming machine may have its own dedicated sensor arrangement controller/processor.

FIG. 4 shows multiple reel/motor/driver assemblies 410. Each of these assemblies may be similar to the reel assembly 300 shown in FIG. 3. Each assembly 410 includes a rotatable element comprising a reel in this case, a motor, and a motor drive circuit. The motor drive circuit of the respective assembly is operable under the control of processor 408 to rotate the respective reel about its rotational axis through a number of rotations and then come to a stop at a desired stop position. FIG. 4 also shows an EGM/Game processor 412 that may comprise a processor programmed to provide overall control of the gaming machine to provide various games that show game play results via the rotating elements, that is, reels in this example.

The output from the sensor arrangement controller/processor 406, or each such sensor arrangement controller/processor where multiple such elements are included in a given implementation, is communicated to other elements of the gaming machine for use in accordance with the operation of the gaming machine. In a prize-first implementation, the output of controller processor 406 may be directed to a motor controller processor 408 of the gaming machine for use in verifying that the stop position selected to show the result/prize for the activation of the gaming machine corresponds to the stop position/rotational position sensed by the sensor arrangement for the given rotatable element. In a reels-first implementation where the reels are randomly stopped to show a result in the game, the output of controller processor 406 may be directed to EGM/game processor 412 so that processor may identify any prize associated with the stop positions of the various reels.

Figure 6:
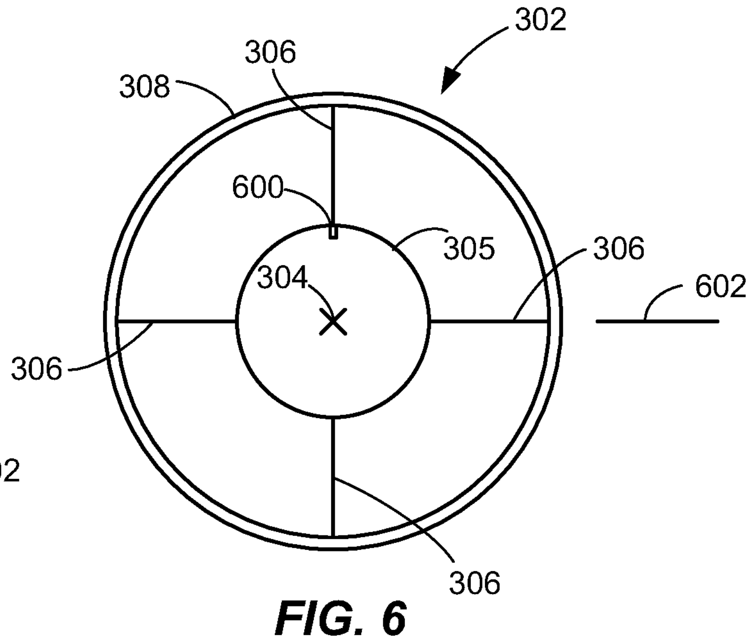
FIG. 6 is a schematic side view of a reel cage that may be used in connection with the reel strip shown in FIG. 3 and as part of each reel/motor assembly shown in FIG. 3. The side view of FIG. 4 shows the side of the reel cage assembly facing a bracket of the reel/motor assembly such as the bracket shown in FIG. 1.
Figure 7:
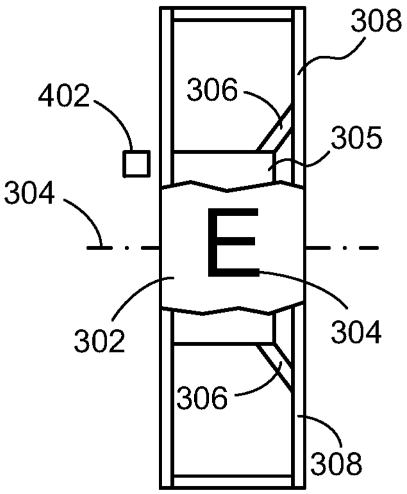
FIG. 7 is a front view of the reel cage shown in FIG. 6 perpendicular to the cage assembly rotational axis and with the reel strip of FIG. 5 installed thereon, but broken away on both sides of reel symbol "E" to show the underlying cage structure.

FIG. 6 shows a schematic side view of the reel cage 302 shown in the example reel assembly 300 of FIG. 3. In this orientation, the rotational axis 304 of the reel cage 302 extends perpendicular to the drawing sheet. The example of FIG. 6 shows a home position feature 600 comprising an open slot in a rim/flange of hub 305. As shown in FIG. 7, the home position sensor 602 is positioned at a radial distance from the axis of rotation 304 to produce a home position signal as the home position feature 600 passes the home position sensor 602 as the reel cage is rotated about axis 304. Thus in this example, the home position sensor arrangement may include a photosensor positioned at 602 in FIG. 7 and a suitable light source positioned on the opposite side of the slot-type home position feature. Alternative arrangements for the home position sensor may include a light source and photosensor facing the same direction and the home position feature may comprise a reflective strip that reflects light to the photosensor to cause the photosensor to produce a signal as the reflective strip passes. In any case, the position of the sensor is located at a known angular orientation to an evaluation position that is stationary with respect to the rotatable element. If the sensor 402 is positioned in the reel assembly so as to align with the home position feature 600 in the position of FIG. 6, the sensor position would be at an angle of 90 degrees to the evaluation position shown at 402 in FIG. 7.

It will be appreciated that a game symbol strip such as strip 500 in FIG. 5 may be wrapped around the rim 308 of reel cage 302 to provide a series of game symbol positions 502 that rotate with the cage 302. The game symbol strip may be connected to the reel cage 302 so that a known position on the game symbol strip aligns with the home position feature. This relationship between the game symbol strip and the home position feature together with the sensor position at a known angle to the evaluation position together allow the rotation signal to be employed to produce the sensor arrangement output indicative of a position of the series of game symbol positions relative to the evaluation position.

The rotation signal may be produced by any suitable magnetic field-type rotation sensor. For example, the rotation signal may be produced by sensing a magnetic field of a magnet that is attached to the rotatable element so as to rotate with the rotatable element about the axis of rotation. The magnetic field sensor arrangement may comprise an arrangement of Hall effect sensors for example. The invention is also not limited to any particular form of the rotation signal. For example, the signal communicated to the sensor arrangement controller/processor 406 may comprise an analog signal such as a voltage signal that is dependent upon the angular orientation of the rotatable element and magnet connected thereto. Alternatively, the signal output from the field sensor arrangement may be a pulse train, that is, a series of pulses that are generated in dependence on the rotation of the rotatable element and produced at a defined resolution. For example, some implementations of the field sensor arrangement may output a signal in the form of a series of pulses where one pulse is produced for each X degrees of rotation of the rotatable element (one pulse per each one-tenth degree of rotation as a specific example). In this case, the controller/processor 406 may be adapted to count pulses received from sensor arrangement 404 after receipt of the home position signal to produce the sensor output indicative of the position along the series of game symbols relative to the evaluation position. In other implementations, the field sensor arrangement may output a signal in the form of pulses in which the pulse width relates to a given amount of rotation. For example, a 1 μs pulse width might indicate 0.1 degree of rotation, a 2 μs pulse width might indicate 0.2 degree of rotation, and so forth. In these implementations a single pulse may be produced to indicate the amount of rotation. In yet further implementations, the field sensor arrangement may be configured to output a signal in the form of a data packet containing rotation information.

It will be appreciated that the various processing steps described above in connection with the controllers or processors shown in FIG. 4 may be divided in any suitable fashion amongst physical processing devices. For example, the processing performed by controller/processor 406 may be performed by the motor controller processor or elsewhere.

It will also be appreciated that sensors other than optical-type sensors may be used to provide the home position signal.

Figure 8:
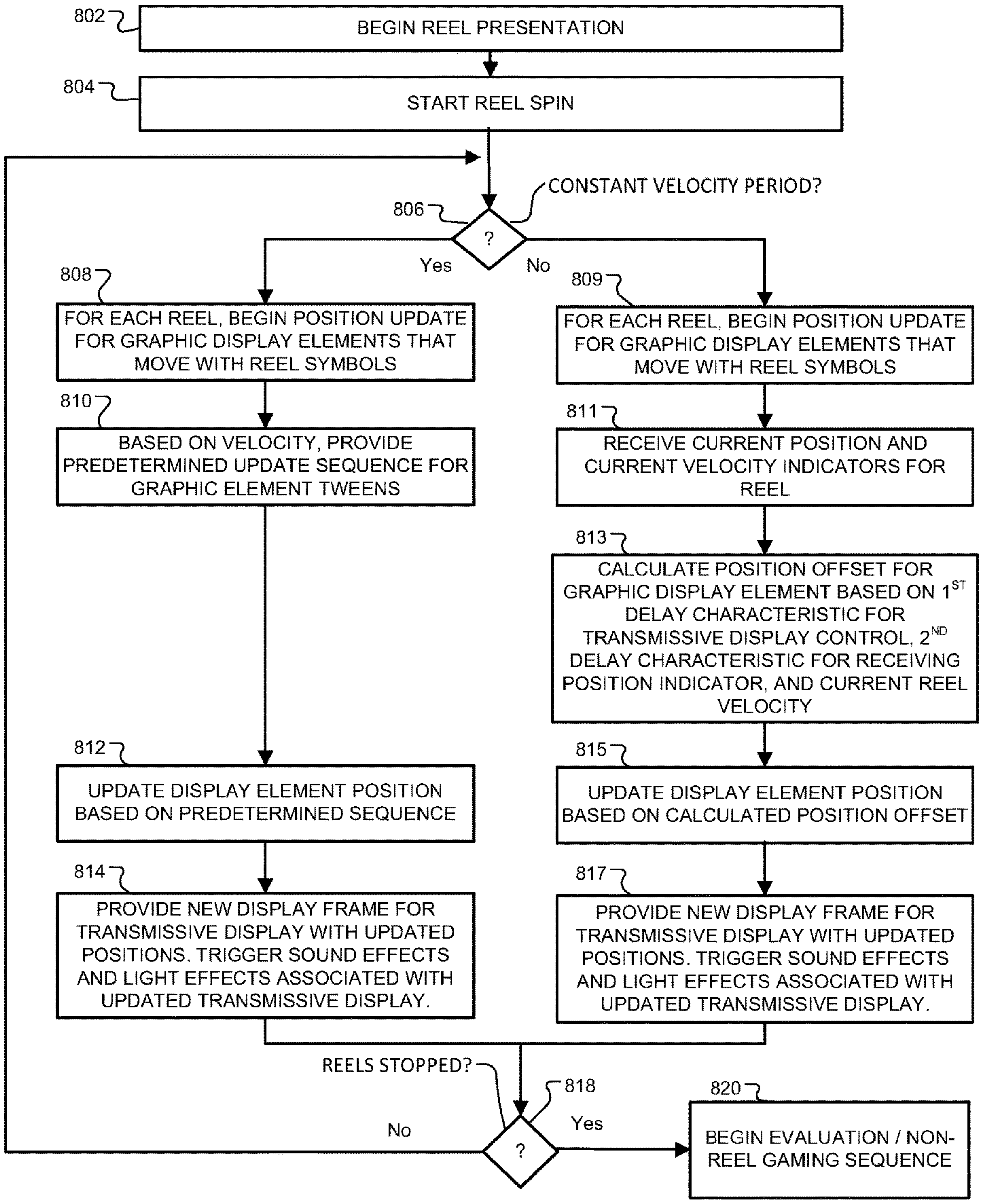
FIG. 8 is a flow diagram showing process steps in accordance with some embodiments of the present invention.

FIG. 8 is a flowchart of a process for operating a gaming machine to under control of at least one electronic processor to provide transmissive display graphics over a mechanical reel display. The process is suitable for use with the gaming machine and gaming systems as described herein, and other suitable gaming machines.

At block 802, the process begins a reel presentation of a gaming result through the mechanical reel display. The result is randomly produced or randomly selected, and may be presented entirely through the symbols on the mechanical reels and their overlaying transmissive display, or partially through the reels and partially through other graphic presentation elsewhere in the display system.

At block 804, the process starts the reel spin for the mechanical reel display to present the result. The overall presentation of the result includes causing reels of a mechanical reel display of the gaming machine to spin and stop to display a symbol pattern on selected symbol locations visible through a transmissive video display of the gaming machine. The process generally includes, as shown in this embodiment at blocks 808 through 818, while the reels are spinning, receiving a position indicator from the mechanical reel display indicating a current position of each reel, and while the reels are spinning, providing graphic display elements using the transmissive display, the graphic display elements controlled to move along with selected ones of the symbols based on the current position indicator and a first delay characteristic associated with the transmissive display.

In this embodiment, the process works differently for a constant velocity period in which the reels are spinning at a constant velocity, and a deceleration period in which the reels, individually or collectively, are slowing their spin in order to stop. Other embodiments may not include the two different control paths displayed on the flow chart and instead use only one control method to achieve the same result. It is also noted that, while a linear, step-by-step control process is shown, this is not limiting and various implementations may employ interrupt-driven or parallel processes in which multiple steps occur in parallel.

At block 806, the process determines whether the reel spin for a reel is in its constant velocity period. If not, the process goes to block 809, where it begins a position update for a graphic display element that moves on the transmissive display along with the moving reel symbols of the reel. This update includes, as shown at block 811, receiving a current position indicator for the reel from the reel controller, and may include receiving a current velocity indicator. As discussed above, due to parallel execution, the update may be occurring regularly in the background and a currently held value employed at block 811.

At block 813, the process calculating a position offset for each of the graphic display elements which are to be moved along with selected ones of the reel symbols. This calculation is based on a first delay characteristic associated with the transmissive display, a second delay characteristic associated with receiving the position indicator, and a velocity indicator for the reels. The first and second delay characteristics are employed for synchronizing the movement of graphic elements on the transmissive display with the movement of the mechanical reels in order to display graphic elements moving along with the symbols.

In a preferred embodiment, the first delay characteristic is characterized in advance for the particular gaming machine involved and stored in memory for use by the process. The first delay characteristic quantifies or describes the delay associated with sending commands to move graphics to the transmissive display and the delay associated with implementing the commands. The delay may be associated with an entire frame update of the display, or with an individual movement of a graphic element. The delay may be quantified in time, in clock cycles, or in another suitable metric related to the timing of the display graphics, such as a portion of a frame delay or frame rate, for example.

In a preferred embodiment, the second delay characteristic is also characterized in advance for the particular gaming machine involved, and stored in memory for use by the process. The second delay characteristic quantifies or describes the delay associated with measuring the position of the reel and providing that position update to the EGM/Game Processor. For example, in the embodiment of FIG. 4, the second delay characteristic describes the time it takes to obtain a measurement from rotation sensor arrangement 404, process that measurement in sensor arrangement/control processor 406, and transmit that measurement to EGM/game processor 412, and move it to the appropriate memory location to make it available for use by the game graphics processes for transmissive display 90. The second delay characteristic may also include a delay associated with processing the position update for each frame update of transmissive display 90. The second delay characteristic may be expressed in any suitable format similarly to the first delay characteristic. As can be understood, in some embodiments, these delay characteristics may be combined into a single delay characteristic expressing both delays discussed above.

The velocity indicator may be provided based on commands sent to the motor control processor controlling the reels rotation, or may be calculated based on multiple measurements from the rotation sensor arrangement. The velocity indicator is preferably expressed as a revolutions per minute (RPM) of the reel, but may be expressed in another format such as velocity of movement along transmissive display 90. Whatever technique is used to provide the velocity indicator, it is employed to reflect the best known current velocity of the reel when the graphic element position update is calculated. The graphic display elements are positioned further based on a reel velocity at least during the deceleration period.

In a preferred embodiment, the velocity indicator is adjusted with a scalar to calculate a motor offset position associated with offsetting the displayed graphic elements to synchronize them with the mechanical reel symbol positions. For both conditions in the depicted process (constant velocity period and deceleration period), the velocity indicator is preferably employed to calculate a standard motor position offset tracking offset ($MP_{SO}$). For the constant velocity period, a conditional motor position offset $MP_{CO}$ is calculated which is $MP_{SO}$ plus $MP_{TO}$, which is a is the RPM velocity times a scalar representing a number of motor positions to offset relative to the velocity. For the decelerating velocity period, $MP_{CO}$ is equal to $MP_{SO}$.

At block 815, the process includes updating the position of one or more display elements that move with reel symbols based on the calculated position offset. Other display elements on the transmissive display may be static or move in a manner unrelated to the reel movement. At block 817, the process includes providing a new display frame for the transmissive display with the graphic elements included at the updated positions. The process may also include triggering sound effects through audio controller 1009 (FIG. 10) and lighting effects through lighting controller 1019. Such presentation of lighting or sound effects is preferably done in a synchronized manner with the transmissive display updates. The synchronization may include dispatching commands to audio controller 1009 or lighting controller 1019 based on a delay time associated with activating a particular speaker or light device in order to synchronize a display even on the transmissive display with an associated lighting or sound event presented through gaming machine 900. As such, in some embodiments the process may include while the reels are spinning, triggering at least one of: a lighting effect synchronized in time with a selected effect on the transmissive graphic display, or a sound effect synchronized in time with a selected effect on the transmissive graphic display.

Referring again to block 806, if the reel concerned is spinning in a constant velocity period, that is before any deceleration begins to stop the reel, the process goes to block 808, where it begins a different technique in which the graphic display elements are positioned further based a predetermined update sequence at least during the constant velocity period. In this technique, at block 810, based on the velocity indicator, a predetermined update sequence is provided to animate the movement of each graphic element, which provides a set of in-betweens or "tweens" for animating the movement. At block 812, the position of the graphic elements is updated based on this predetermined sequence, which does not require further positional calculation. If only one constant reel velocity is available for a particular game on a particular machine, the update sequence does not require selection based on velocity, and only one predetermined sequence is required to be prepared based on the velocity for each graphic element which moves along with symbols.

At block 814, a new display frame is provided for the transmissive display with the updated positions provided from the predetermined sequence. Block 814 may also include triggering sound effects and light effects in a synchronized manner with the transmissive display update as discussed above with respect to block 817. In some embodiments, the process of blocks 808, 810, 812, and 814 is not needed, and a single process using the current velocity indicator may be used, for example that of blocks 809, 811, 813, 815, and 819. In such case block 806 is not needed. Conversely, in other embodiments, a single process is used only based on a predetermined update sequence. In such embodiments, the predetermined update sequence similar to that of blocks 808, 810, 812, and 814 may be used, and may include updates that occur during a constant velocity period and a deceleration period. In such a case, the process of blocks 809, 811, 813, 815, and 819 is not used, and the decision at block 806 is not necessary.

Following each frame update or each position update (if the position updates do not match the transmissive display frame rate), the process at block 818 determines if all the reels are stopped. If so, the process goes to block 820 where it begins reel evaluation for the game or further non-reel based gaming sequences. If reels are still spinning at block 818, the process goes back to block 806 where it continues to update transmissive display elements for those reels that are spinning.

Figure 9:
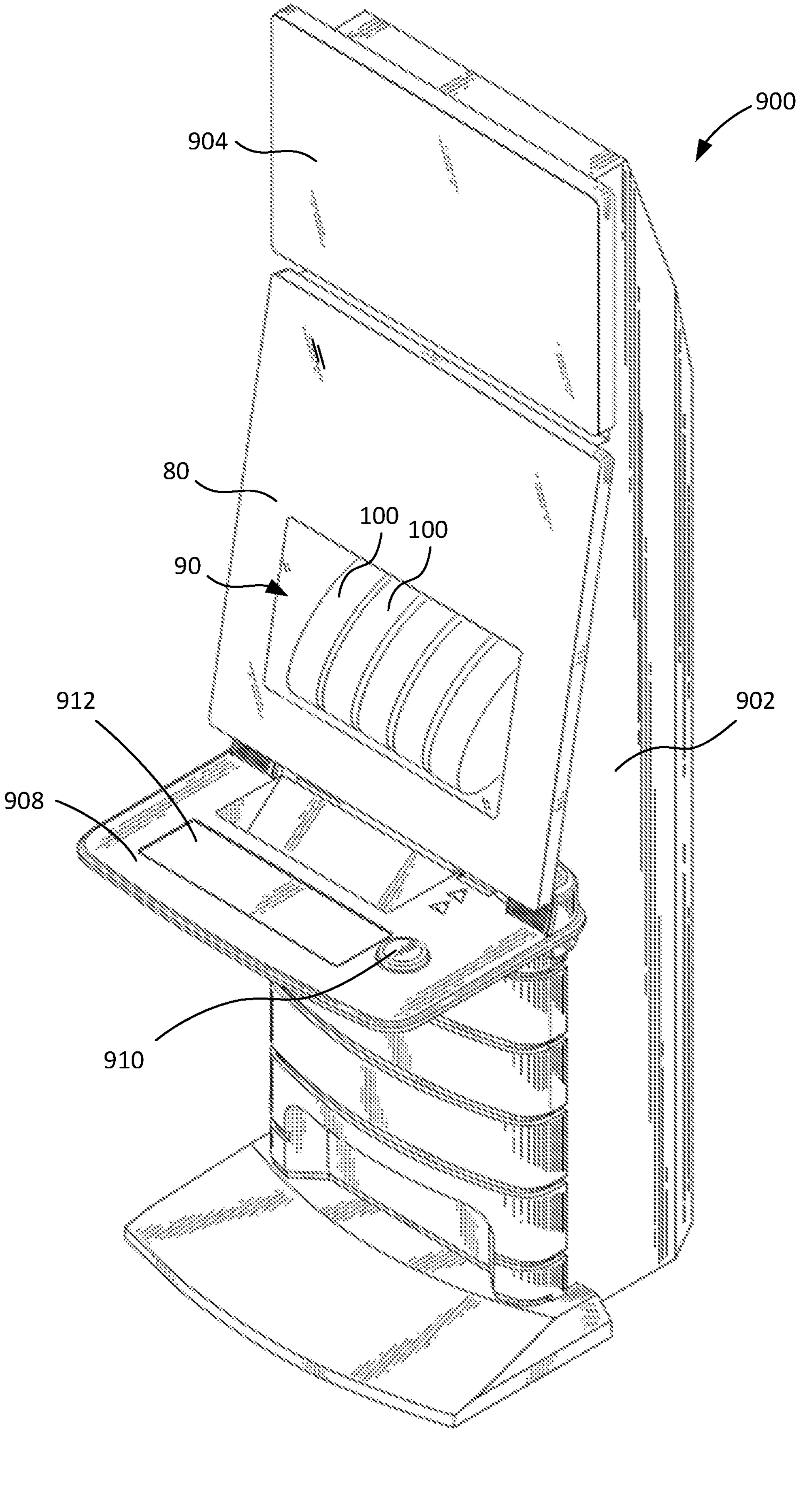
FIG. 9 is a front perspective view of a gaming machine according to some embodiments.

FIG. 9 is a perspective view of a gaming machine 900 which is suitable for implementing the transmissive display update processes described herein. Gaming machine 900 includes a cabinet 902 that houses various elements of the gaming machine. A front side of cabinet 902 supports an upper display device 904 and a lower display device 80. The front side of cabinet 902 also supports a button deck 908 that contains various player controls and interface devices including play button 910 and a touch screen button panel/user interface 912.

Integrated with lower display device 80 is transmissive display 90 through which may be viewed mechanical reels 100. Transmissive display 90 functions as described herein to display additional graphic elements, for example elements 102 in FIG. 1, some of which are animated to move along with movement of symbols on mechanical reels 100 as described above.

It will be appreciated that gaming machines may also include a number of other player interface devices in addition to devices that are considered player controls for use in entering inputs in the course of a particular game. For example, gaming machine 900 may include a currency/voucher acceptor, a voucher/receipt printer having a voucher/receipt printer, and a player card reader although these elements are not called out in FIG. 9. Numerous other types of player interface devices may be included in gaming machines that may be used to implement embodiments of the present invention.

Figure 10:
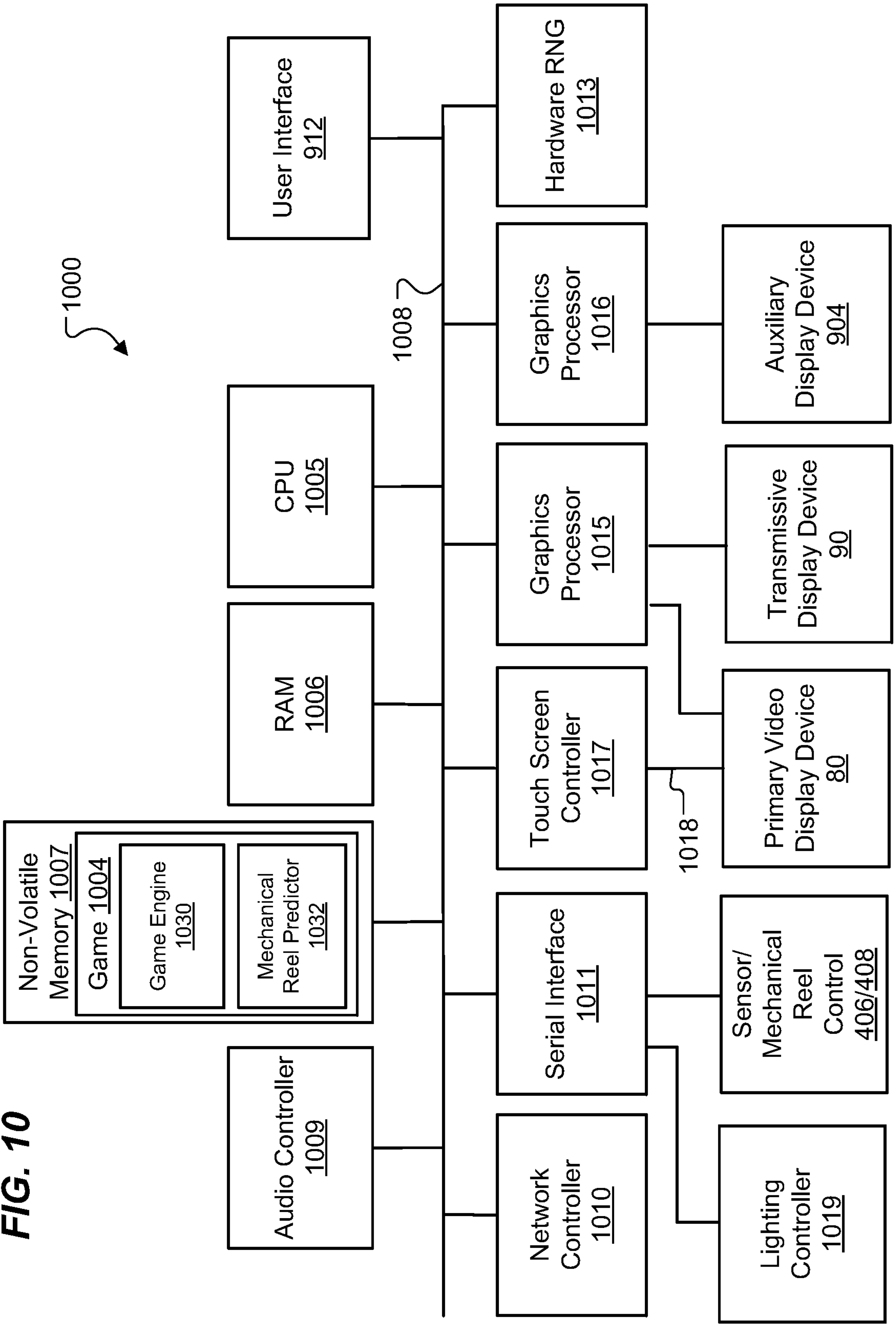
FIG. 10 is a hardware and logical block diagram of a gaming machine according to some embodiments.

FIG. 10 shows a hardware and logical block diagram of gaming machine 1000 which includes a central processing unit (CPU) 1005 along with random access memory 1006 and nonvolatile memory or storage device 1007. The depicted design is suitable for implementing a gaming machine 900 (FIG. 9) or other similar gaming machines including mechanical reels behind a transmissive display and performing the mechanical reel prediction processes described herein. The depicted devices are connected on a system bus 1008 with an audio controller 1009, a network controller 1010, and a serial interface 1011. Serial interface 1011 connects to reel position sensor arrangement controller/processor 406 and reel motor controller processor 408, which controls the movement of reels 100. Serial interface 1011 also connects to a lighting controller 1019 for controlling various lighting effects on cabinet 902, which may include LED lights around displays 80 and 904, or other lights mounted in cabinet 902 such as floor lights or lights along button deck 908. A graphics processor 1015 is also connected on system bus 1008 and is connected to drive primary video display device 80 (mounted in cabinet 902 as shown in FIG. 9) and transmissive display 90. A second graphics processor 1016 is also connected on system bus 1008 in this example to drive the auxiliary display device 904. Gaming machine 1000 also includes a touch screen controller 1017 connected to system bus 1008. Touch screen controller 1017 is also connected via signal path 1018 to receive signals from a touchscreen element associated with primary video display device 80. It will be appreciated that the touchscreen element itself typically comprises a thin film that is secured over the display surface of primary video display device 80. The touchscreen element itself is not illustrated or referenced separately in the figures, and is not used in some embodiments.

Those familiar with data processing devices and systems will appreciate that other common electronic components will be included in gaming machine 1000 such as a power supply, cooling systems for the various system components, audio amplifiers, and other devices that are common in gaming machines. These additional devices are omitted from the drawings so as not to obscure the present invention in unnecessary detail.

Generally, the hardware elements shown in FIG. 10 are known elements used in the gaming machine industry. These elements are preferably mounted in a computer chassis which is housed in cabinet 902 shown in FIG. 9. Alternatively, the various electronic components may be mounted on one or more circuit boards or modules housed within cabinet 902 without a separate enclosure. Those familiar with data processing systems and the various data processing elements shown in FIG. 10 will appreciate that many variations on this illustrated structure may be used within the scope of the present invention. For example, since serial communications are commonly employed to communicate with a touch screen controller such as touch screen controller 1017, the touch screen controller may not be connected on system bus 1008, but instead include a serial communications line to serial interface 1011, which may be a USB controller or a IEEE 1394 controller for example. It will also be appreciated that some of the devices shown in FIG. 10 as being connected directly on system bus 1008 may in fact communicate with the other system components through a suitable expansion bus. Audio controller 1009, for example, may be connected to the system via a PCI bus. System bus 1008 is shown in FIG. 10 merely to indicate that the various components are connected in some fashion for communication with game processor/CPU 1005 and is not intended to limit the invention to any particular bus architecture. Numerous other variations in the gaming machine internal structure and system may be used without departing from the principles of the present invention.

Although separate graphics processor 1015 is shown for controlling primary video display device 80, and graphics processor 1016 is shown for controlling both auxiliary display device 904, it will be appreciated that game processor/CPU 1005 may control all of the display devices directly without any intermediate graphics processor. The invention is not limited to any particular arrangement of processing devices for controlling the video display device included with gaming machine 1000. Also, a gaming machine implementing the present invention is not limited to any particular number of video display devices or other types of display devices.

In the illustrated gaming machine 1000, game processor/CPU 1005 executes software which ultimately controls the entire gaming machine including the receipt of player inputs and the presentation of the graphic symbols displayed according to the invention through the display devices 80 and 90 associated with the gaming machine. As will be discussed further below, game processor/CPU 1005 either alone or in combination with graphics processor 1015 may implement a presentation controller for performing functions associated with a primary game that may be available through the gaming machine, and may also implement a game client for directing one or more display devices at the gaming machine to display the feature game mode according to the present invention. Game processor/CPU 1005 also executes software related to communications handled through network controller 1010, and software related to various peripheral devices such as those connected to the system through audio controller 1009, serial interface 1011, and touch screen controller 1017. Game processor/CPU 1005 may also execute software to perform accounting functions associated with game play. Random access memory 1006 provides memory for use by game processor/CPU 1005 in executing its various software programs, while the nonvolatile memory or storage device 1007 may comprise a hard drive or other mass storage device providing storage for programs not in use or for other data generated or used in the course of gaming machine operation. Network controller 1010 provides an interface to other components of a gaming system in which gaming machine 1000 is included.

It should be noted that the invention is not limited to gaming machines employing the arrangement of processing devices and interfaces shown in example gaming machine 1000. Other gaming machines through which the features herein are implemented may include one or more special purpose processing devices to perform the various processing steps for implementing the present invention, such as generating random numbers or checking the security status of software packages or gaming credit vouchers. Unlike processing devices such as game processor/CPU 1005, these special purpose processing devices may not employ operational program code to direct the various processing steps.

Still referring to FIG. 10 showing an example design for a gaming machine 1000, the depicted machine in operation is controlled generally by game processor/CPU 1005 which stores operating programs and data in non-volatile memory or storage device 1007 with game software module 1004, and software or drivers for user interface 912, network controller 1010, audio/visual controllers, and a hardware random number generator (RNG) 1013, which is employed if software RNG procedures are not allowed in a particular gaming jurisdiction. Either hardware RNG 1013 or a suitable software RNG are employed for making the random selections of game outcomes, reel stop positions, etc. when operating the game as described herein.

The game software module 1004, once installed, also is held in non-volatile memory of the EGM, preferably a separate flash drive or hard drive from the memory holding the EGM operating system. CPU or game processor/CPU 1005 may comprise a conventional microprocessor, such as an Intel microprocessor, mounted on a printed circuit board with supporting ports, drivers, memory, software, and firmware to communicate with and control gaming machine operations, such as through the execution of code stored in non-volatile memory or storage device 1007. Such executed code includes a game software 1004 for executing one or primary game modules and including software for controlling a mechanical reel presentation through mechanical reel controller 408. Non-volatile memory 1007 also holds mechanical reel prediction software or firmware 1032, which is executed by CPU 1005 to perform the processes and techniques described herein for predicting the location of the mechanical reels, for example the process of FIG. 8. Game processor/CPU 1005 connects to user interface 912 such that a player may enter input information, and game processor/CPU 1005 may respond according to its programming, such as to apply a wager and initiate execution of a game.

Figure 11:
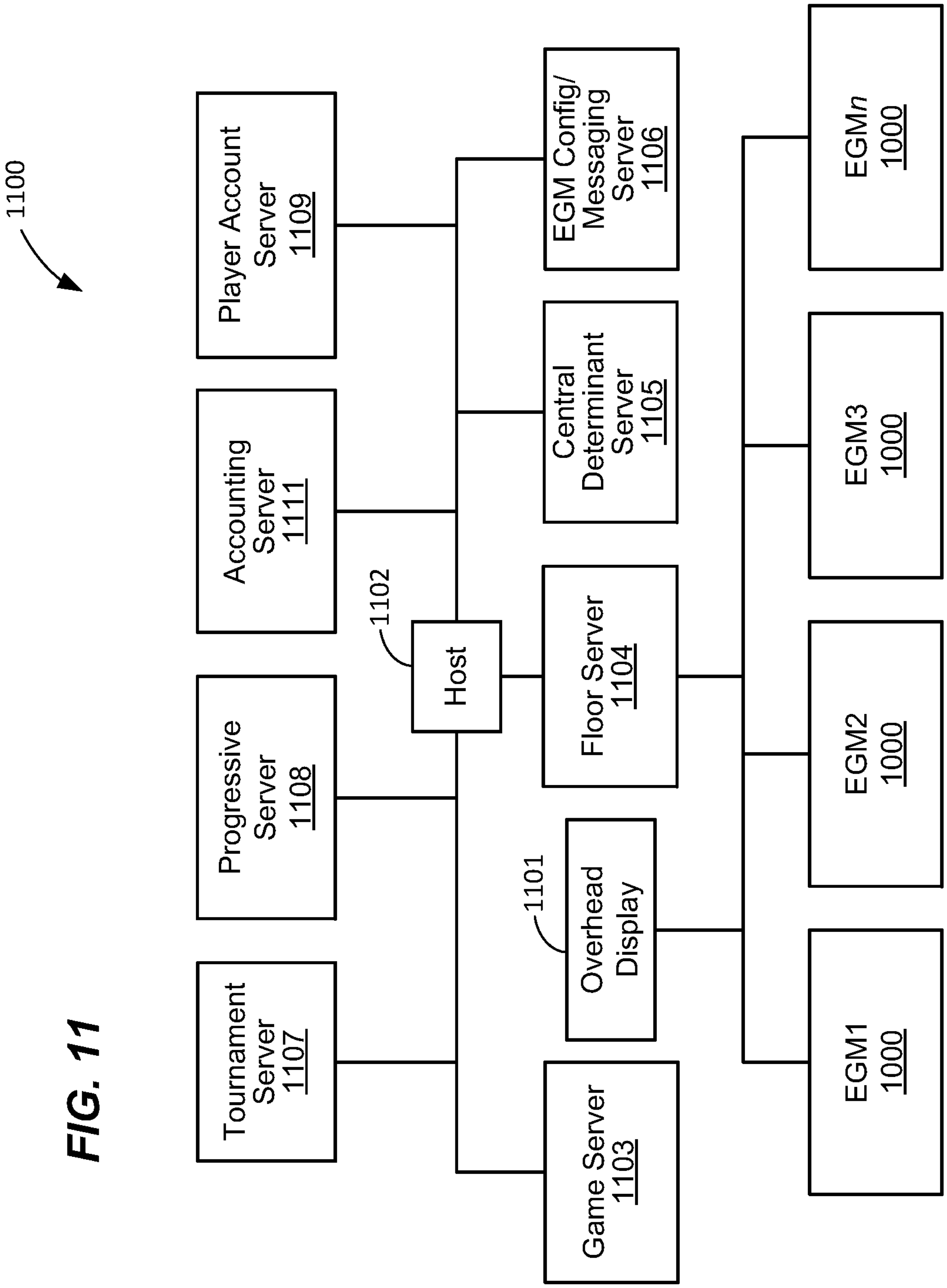
FIG. 11 is a network diagram of a networked gaming system according to some embodiments.

Game processor/CPU 1005 also may connect through network controller 1010 to a gaming network, such as example casino server network 1100 shown in FIG. 11.

Referring now to FIG. 11, a networked gaming system 1100 associated with one or more gaming facilities may include one or more networked gaming machines 1000 (shown in FIG. 11 as EGM1-EGMn) connected in the network by suitable network cable or wirelessly. Networked gaming machines 1000 and one or more overhead display devices 1101 may be operatively connected so that the overhead display device or display devices may mirror or replay the content of one or more displays of gaming machines 1000. For example, the display content for a given gaming machine 1000 (including a base game portion and/or bonus features) may be transmitted through network controller 1010 to a controller associated with the overhead display device(s) 1101. In the event gaming machines 1000 have cameras installed, the respective player's video images may be displayed on overhead display device 1101 along with the content of the player's gaming machine display.

The example gaming network 1100 shown in FIG. 11 includes a host server 1102 and floor server 1104, that together may function as an intermediary between floor devices such as gaming machines 1000 and back-office devices such as the various servers described below. Game server 1103 may provide server-based games and/or game services to network connected gaming devices such as gaming machines 1000. Central determinant server 1105 may be included in the network to identify or select lottery, bingo, or other centrally determined game results and provide the result information to networked gaming machines 1000 that present the games or game results to players.

EGM configuration and messaging server 1106 may provide game and non-game content and operational software for use by the gaming machines 1000 in the course of providing games and while the gaming machines are unused and in an idle state. For example, server 1106 may control the distribution of game software and graphic control assets to the gaming machines as well as advertising messages and other messages that may be presented using a display device of a gaming machine 1000. EGM configuration and messaging server 1106 may also be used to direct candle control software to gaming machines 1000 that include a system in accordance with aspects of the present invention.

Tournament server 1107 may be included in the system for controlling or coordinating tournament functions. These functions may include maintaining tournament player scores and ranking during the course of tournament play, and communicating this information to the various gaming machines 1000 participating in the tournament. Tournament server 1107 may also function to enroll players in tournaments, schedule tournaments, and maintain the time remaining in the various tournaments.

Progressive server 1108 may maintain progressive pools for progressive games that may be available through the various gaming machines 1000. In some implementations, progressive server 1108 may simply receive communications indicating contribution amounts that have been determined by processes executing at the various gaming machines 1000 or elsewhere in the gaming network. Alternatively, progressive server 1108 may perform processes to determine the contribution amounts for incrementing the various progressive pools that may be maintained. Progressive server 1108 may also periodically communicate current pool values back to the various gaming machines 1000 and may participate in communicating awarded progressive prize amounts to the gaming machines and in adjusting the progressive prize pools accordingly. In some implementations, progressive server 1108 may also determine or participate in determining when a progressive prize triggering event occurs.

Accounting server 1111 may receive gaming data from each of the networked gaming devices, perform audit functions, and provide data for analysis programs. Player account server 1109 may maintain player account records, and store persistent player data such as accumulated player points and/or player preferences (for example, game personalizing selections or options).

Gaming network 1100 illustrated in FIG. 11 is provided merely as an example of a gaming network that may include gaming machines with candle systems according to aspects of the present invention and is not intended to be limiting in any way. Gaming machines controlled according to aspects of the present invention are not limited to use with gaming networks such as network 1100.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements that does not have the defined characteristic or feature.

The above-described representative embodiments are intended to illustrate the principles of the invention, but not to limit the scope of the invention. Various other embodiments and modifications to these representative embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A gaming machine comprising:

a cabinet with at least one player input device;

a mechanical reel display mounted in the cabinet and comprising multiple reels each with multiple symbols thereon;

a transmissive video display positioned in front of the mechanical reel display; and at least one electronic controller coupled to control the mechanical reel display and the transmissive video display and programmed for:

causing the reels to spin and stop to display symbols on selected symbol locations visible through the transmissive video display;

while the reels are spinning, receiving a position indicator from the mechanical reel display indicating a current position of each reel; and while the reels are spinning, providing graphic display elements using the transmissive video display, the graphic display elements controlled to move along with selected ones of the symbols based on the position indicator and a first delay characteristic associated with the transmissive video display.

2. The gaming machine of claim 1 wherein the graphic display elements are controlled further based on a second delay characteristic associated with receiving the position indicator.

3. The gaming machine of claim 2 wherein the electronic controller is further programmed for calculating a position offset for the graphic display elements based on the first delay characteristic, the second delay characteristic, and a velocity indicator for the reels.

4. The gaming machine of claim 3 wherein the velocity indicator is adjusted with a scalar.

5. The gaming machine of claim 1 wherein:
the mechanical reel display has a deceleration period associated with stopping the reels; and
the graphic display elements are positioned further based on a reel velocity at least during the deceleration period.

6. The gaming machine of claim 1 wherein:
the mechanical reel display has a constant velocity period associated with spinning the reels; and
the graphic display elements are positioned further based a predetermined update sequence at least during the constant velocity period.

7. The gaming machine of claim 1 wherein the transmissive video display is positioned in a central area of a larger display.

8. A method of operating a gaming machine under control of at least one electronic processor, the method comprising:
causing reels of a mechanical reel display of the gaming machine to spin and stop to display symbols on selected symbol locations visible through a transmissive video display of the gaming machine;
while the reels are spinning, receiving a position indicator from the mechanical reel display indicating a current position of each reel; and
while the reels are spinning, providing graphic display elements using the transmissive video display, the graphic display elements controlled to move along with selected ones of the symbols based on the position indicator and a first delay characteristic associated with the transmissive video display.

9. The method of claim 8 wherein the graphic display elements are controlled further based on a second delay characteristic associated with receiving the position indicator.

10. The method of claim 9, further comprising calculating a position offset for the graphic display elements based on the first delay characteristic, the second delay characteristic, and velocity indicator for the reels.

11. The method of claim 10 wherein the velocity indicator is adjusted with a scalar.

12. The method of claim 8 wherein:
the mechanical reel display has a deceleration period associated with stopping the reels; and
the graphic display elements are positioned further based on a reel velocity at least during the deceleration period.

13. The method of claim 8 wherein:
the mechanical reel display has a constant velocity period associated with spinning the reels; and
the graphic display elements are positioned further based a predetermined update sequence at least during the constant velocity period.

14. The method of claim 8 further comprising:
while the reels are spinning, triggering at least one of: a lighting effect synchronized in time with a selected effect on the transmissive graphic display, or a sound effect synchronized in time with a selected effect on the transmissive graphic display.

15. One or more tangible, non-transitory computer readable media holding instructions executable by at least one electronic processor a gaming machine for:
causing reels of a mechanical reel display of the gaming machine to spin and stop to display symbols on selected symbol locations visible through a transmissive video display of the gaming machine;
while the reels are spinning, receiving a position indicator from the mechanical reel display indicating a current position of each reel; and
while the reels are spinning, providing graphic display elements using the transmissive video display, the graphic display elements controlled to move along with selected ones of the symbols based on the position indicator and a first delay characteristic associated with the transmissive video display.

16. The one or more tangible, non-transitory computer readable media of claim 15 wherein the graphic display elements are controlled further based on a second delay characteristic associated with receiving the position indicator.

17. The one or more tangible, non-transitory computer readable media of claim 16 further comprising calculating a position offset for the graphic display elements based on the first delay characteristic, the second delay characteristic, and velocity indicator for the reels.

18. The one or more tangible, non-transitory computer readable media of claim 17 wherein the velocity indicator is adjusted with a scalar.

19. The one or more tangible, non-transitory computer readable media of claim 15 wherein:
the mechanical reel display has a deceleration period associated with stopping the reels; and
the graphic display elements are positioned further based on a reel velocity at least during the deceleration period.

20. The one or more tangible, non-transitory computer readable media of claim 15 wherein:
the mechanical reel display has a constant velocity period associated with spinning the reels; and
the graphic display elements are positioned further based a predetermined update sequence at least during the constant velocity period.

* * * * *